US010819952B2

(12) United States Patent
Chaney et al.

(10) Patent No.: US 10,819,952 B2
(45) Date of Patent: Oct. 27, 2020

(54) VIRTUAL REALITY TELEPRESENCE

(71) Applicant: SONY INTERACTIVE ENTERTAINMENT NETWORK AMERICA LLC, San Mateo, CA (US)

(72) Inventors: Allison Marlene Chaney, San Francisco, CA (US); Anthony Rogers, Sunnyvale, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 59 days.

(21) Appl. No.: 15/290,985

(22) Filed: Oct. 11, 2016

(65) Prior Publication Data

US 2018/0103237 A1 Apr. 12, 2018

(51) Int. Cl.
H04N 7/15 (2006.01)
H04N 7/14 (2006.01)
G06T 19/00 (2011.01)

(52) U.S. Cl.
CPC ............ *H04N 7/157* (2013.01); *H04N 7/147* (2013.01); *G06T 19/006* (2013.01)

(58) Field of Classification Search
None
See application file for complete search history.

(56) References Cited

U.S. PATENT DOCUMENTS

| 2012/0223885 | A1* | 9/2012 | Perez | G06F 3/011 345/158 |
| 2012/0274745 | A1 | 11/2012 | Russell | |
| 2012/0281059 | A1* | 11/2012 | Chou | H04L 12/1827 348/14.07 |
| 2013/0141419 | A1* | 6/2013 | Mount | G06F 3/011 345/419 |
| 2013/0300637 | A1 | 11/2013 | Smits | |
| 2017/0339372 | A1* | 11/2017 | Valli | H04N 7/157 |

* cited by examiner

Primary Examiner — Nurun N Flora
(74) Attorney, Agent, or Firm — Trellis IP Law Group, PC

(57) ABSTRACT

Implementations generally relate to virtual reality telepresence. In some implementations, a method includes performing projection mapping of a projection area. The method further includes collecting user information associated with a user. The method further includes positioning the user in a virtual environment based on the projection mapping and the user information. The method further includes determining a point of view of the user in the virtual environment. The method further includes projecting the virtual environment onto the projection area based on the point of view of the user.

19 Claims, 10 Drawing Sheets

VIRTUAL REALITY TELEPRESENCE

BACKGROUND

Telepresence involves the use of virtual reality technology, where users across geographically dispersed locations remotely interact with each other such that the users experience the sensation of being present in the same environment. Telepresence may be used in various applications such as video conferencing, where participants communicate with each other in real-time across geographically dispersed locations.

SUMMARY

Implementations generally relate to virtual reality telepresence. In some implementations, a method includes performing projection mapping of a projection area. The method further includes collecting user information associated with a user. The method further includes positioning the user in a virtual environment based on the projection mapping and the user information. The method further includes determining a point of view of the user in the virtual environment. The method further includes projecting the virtual environment onto the projection area based on the point of view of the user.

With further regard to the method, in some implementations, the projection mapping is based on depth data associated with the projection area. In some implementations, the performing of the projection mapping includes displaying structured light patterns on the projection area, and collecting depth data associated with the projection area. In some implementations, the user information includes one or more of red-green-blue video data, depth data, and skeletal tracking information. In some implementations, the user information includes topography information. In some implementations, the method further includes performing head tracking in order to move a virtual camera associated with the user for parallax effect. In some implementations, the method further includes simulating eye contact in the virtual environment.

In some implementations, software is encoded in one or more non-transitory computer-readable storage media for execution by the one or more processors. When executed, the software is operable to perform operations including performing projection mapping of a projection area; collecting user information associated with a user; positioning the user in a virtual environment based on the projection mapping and the user information; determining a point of view of the user in the virtual environment; and projecting the virtual environment onto the projection area based on the point of view of the user.

With further regard to the software, in some implementations, the projection mapping is based on depth data associated with the projection area. In some implementations, to perform the projection mapping, the software when executed is further operable to perform operations including displaying structured light patterns on the projection area, and collecting depth data associated with the projection area. In some implementations, the user information includes one or more of red-green-blue video data, depth data, and skeletal tracking information. In some implementations, the user information includes topography information. In some implementations, the software when executed is further operable to perform operations including performing head tracking in order to move a virtual camera associated with the user for parallax effect. In some implementations, the software when executed is further operable to perform operations including simulating eye contact in the virtual environment.

In some implementations, a system includes one or more processors, and includes logic encoded in one or more non-transitory computer-readable storage media for execution by the one or more processors. When executed, the logic is operable to perform operations including performing projection mapping of a projection area; collecting user information associated with a user; positioning the user in a virtual environment based on the projection mapping and the user information; determining a point of view of the user in the virtual environment; and projecting the virtual environment onto the projection area based on the point of view of the user.

With further regard to the system, in some implementations, the projection mapping is based on depth data associated with the projection area. In some implementations, to perform the projection mapping, the logic when executed is further operable to perform operations including displaying structured light patterns on the projection area, and collecting depth data associated with the projection area. In some implementations, the user information includes one or more of red-green-blue video data, depth data, and skeletal tracking information. In some implementations, the user information includes topography information. In some implementations, the logic when executed is further operable to perform operations including performing head tracking in order to move a virtual camera associated with the user for parallax effect.

A further understanding of the nature and the advantages of particular implementations disclosed herein may be realized by reference of the remaining portions of the specification and the attached drawings.

DETAILED DESCRIPTION

Implementations described herein provide an immersive multi-user virtual reality (VR) telepresence system. The system provides an interactive virtual environment to one or more users and enhances natural user interaction for users when interacting with the projected virtual environment.

In various implementations, multiple users may view each other and interact with each other in the virtual environment. As described in more detail below, the system automatically calibrates the sizes of the users and other objects in the virtual environment such that that projected users and other objects appear to be the correct size and proportional in the scenes of the virtual environment. In various implementations, when the system displays users in the virtual environment, the system tracks movements of users, including their head movements, and the system simulates eye contact between users as they interact with each other in the virtual environment.

The telepresence system may be used in various virtual reality and augmented reality applications. For example, such applications may include teleconferencing, training, instruction, leisure and gaming, remote medicine, industrial applications, etc.

As described in more detail below, in some implementations, a method includes performing projection mapping of a projection area and collecting user information associated with a user. The method further includes positioning the user in a virtual environment based on the projection mapping and the user information. The method further includes determining a point of view of the user in the virtual environment. The method further includes projecting the virtual environment onto the projection area based on the point of view of the user.

Figure 1:
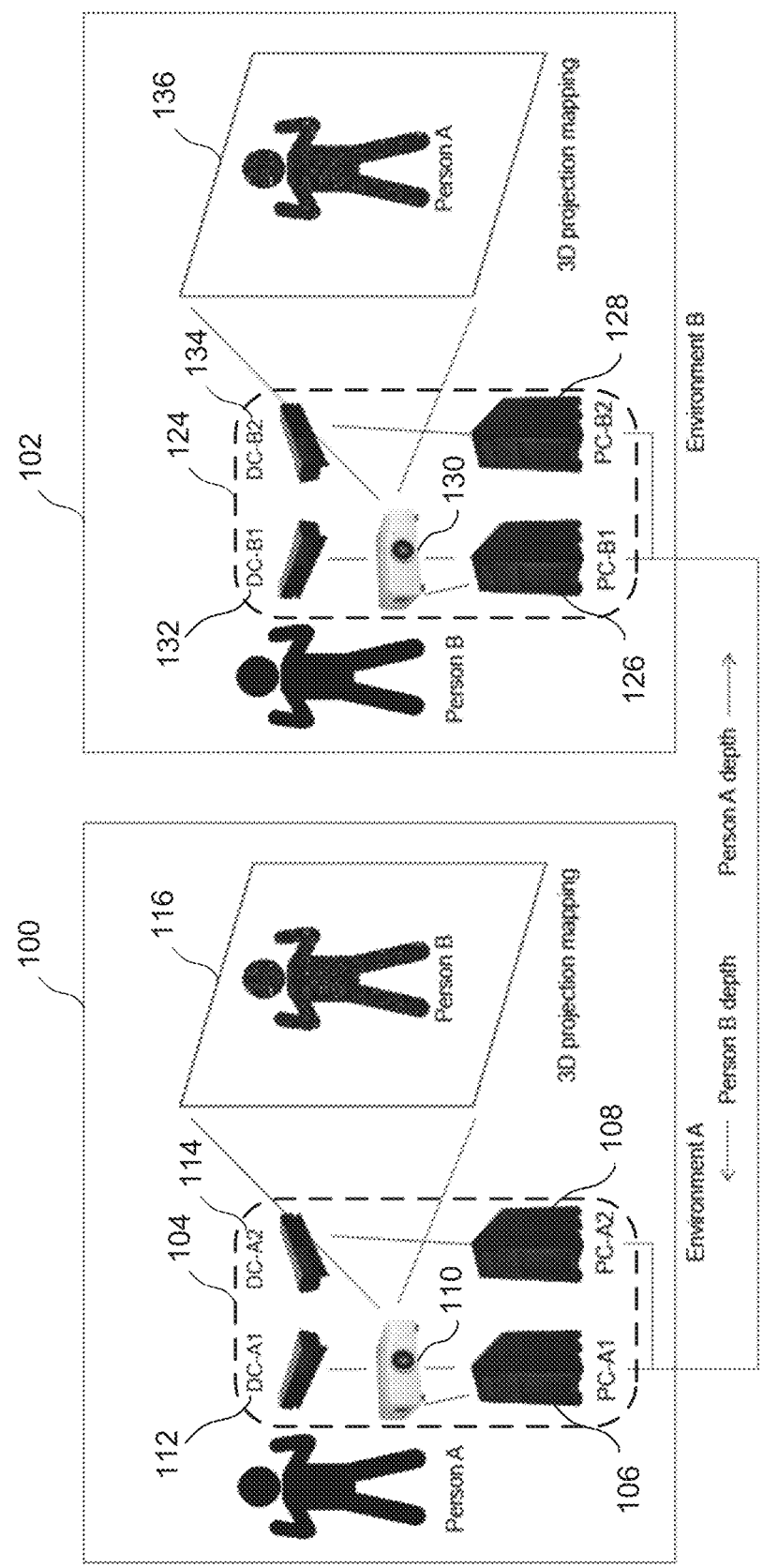
FIG. 1 illustrates a block diagram of example telepresence environments, which may be used for some implementations described herein.

FIG. 1 illustrates a block diagram of example telepresence environments 100 and 102, which may be used for some implementations described herein. As shown, telepresence environment 100, or environment 100, includes a telepresence system 104, or system 104. System 104 includes one or more computing systems 106 and 108 (also labeled PC-A1 and PC-A2, respectively), a 3-dimensional (3D) projector 110, one or more depth cameras 112 and 114 (also labeled DC-A1 and DC-A2, respectively). Also shown is a projection area 116. In some implementations, computing systems 106 and 108 may be integrated into a single device. Similarly, depth camera 112 and depth camera 114 may be integrated into a single device, and may be referred to as depth camera 112/114.

For ease of illustration, FIG. 1 shows two blocks for computing systems 106 and 108, one block for 3D projector 110, and two blocks for depth cameras 112 and 114. Each of blocks 106, 108, 110, 112, and 114 may represent multiple units, and there may be any number of these units or elements. In other implementations, system 104 may not have all of the elements shown and/or may have other elements including other types of elements instead of, or in addition to, those shown herein.

In various implementations, 3D projector 110 performs projection mapping of projection area 116 onto which 3D projector 110 projects a virtual environment. 3D projector 110 also projects one or more remote users (e.g., Person B, etc.) in the projected virtual environment. A local user (e.g., Person A) local to environment 100 can view and interact with the virtual environment by 3D projector 130. Depth camera 112 scans the local user (e.g., Person A) for user information, and depth camera 114 scans the projection area in environment 102 for environment geometry data, which is used for the projection mapping. In various implementations, depth cameras 112 and 114 each provide bit map images that describe depth data of an environment. System 104 and its various components are described in more detail herein.

Telepresence environment 102, or environment 102, includes a telepresence system 124, or system 124. System 124 includes one or more computing systems 126 and 128 (also labeled PC-B1 and PC-B2, respectively), a 3D projector 130, one or more depth cameras 132 and 134 (also labeled DC-B1 and DC-B2, respectively). Also shown is a projection area 136. In some implementations, computing systems 126 and 128 may be integrated into a single device. Similarly, depth camera 132 and depth camera 134 may be integrated into a single device.

For ease of illustration, FIG. 1 shows two blocks for computing systems 126 and 128, one block for 3D projector 130, and two blocks for depth cameras 132 and 134. Each of blocks 126, 128, 130, 132, and 134 may represent multiple units, and there may be any number of these units or elements. In other implementations, system 124 may not have all of the elements shown and/or may have other elements including other types of elements instead of, or in addition to, those shown herein. Furthermore, in various implementations, there may be more than 2 users viewing each other along with corresponding telepresence systems, etc.

In various implementations, 3D projector 130 performs projection mapping of projection area 136 onto which 3D projector 130 projects a virtual environment. 3D projector 130 also projects one or more remote users (e.g., Person A, etc.) in the projected virtual environment. A local user (e.g., Person B) local to environment 102 can view and interact with the virtual environment projected by 3D projector 130. Depth camera 132 scans the local user (e.g., Person B) for user information, and depth camera 134 scans the projection area in environment 102 for environment geometry data, which is used for the projection mapping. System 124 and its various components are described in more detail herein.

As a result, in various implementations, the 3D images of the multiple users are transmitting over the network such that multiple users (e.g., Person A, Person B, etc.) may view each other and interact with each other in the virtual environment. As described in more detail below, in various implementations, systems 104 and 124 project video of users such that they appear to be life size in the virtual environment. As described in more detail herein, in various implementations, when systems 104 and 124 display users in the virtual environment, the systems track movements of users, including their head movements, and simulate eye contact between users as they interact with each other in the virtual environment.

Figure 2:
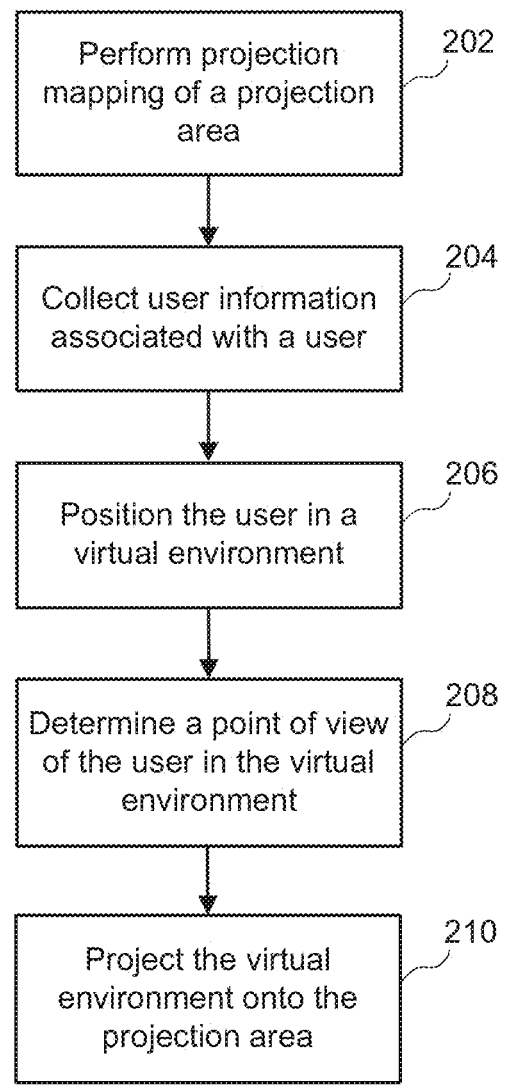
FIG. 2 illustrates an example flow diagram for implementing a telepresence system, according to some implementations.

FIG. 2 illustrates an example flow diagram for implementing a telepresence system, according to some implementations. As described in more detail herein, environment 100 projects a virtual environment to one or more users and enhances natural user interaction of the users with the projected virtual environment.

For simplicity and ease of illustration, unless otherwise indicated, the following implementations are described in the context of system 104 and environment 100 of FIG. 1, where Person A is the local user and Person B is the remote user. These implementations also apply to system 124 and environment 102 of FIG. 1.

Referring to both FIGS. 1 and 2, a method is initiated at block 202, system 104 performs projection mapping of a projection area. As described in more detail herein, the projection mapping is based on collected depth data or environment geometry data associated with the projection area. In some implementations, during the projection mapping, system 104 may also perform distortion correction in the projected virtual environment.

During the projection mapping, in some implementations, 3D projector 110 of system 104 displays structured light patterns on the projection area.

Figure 3:
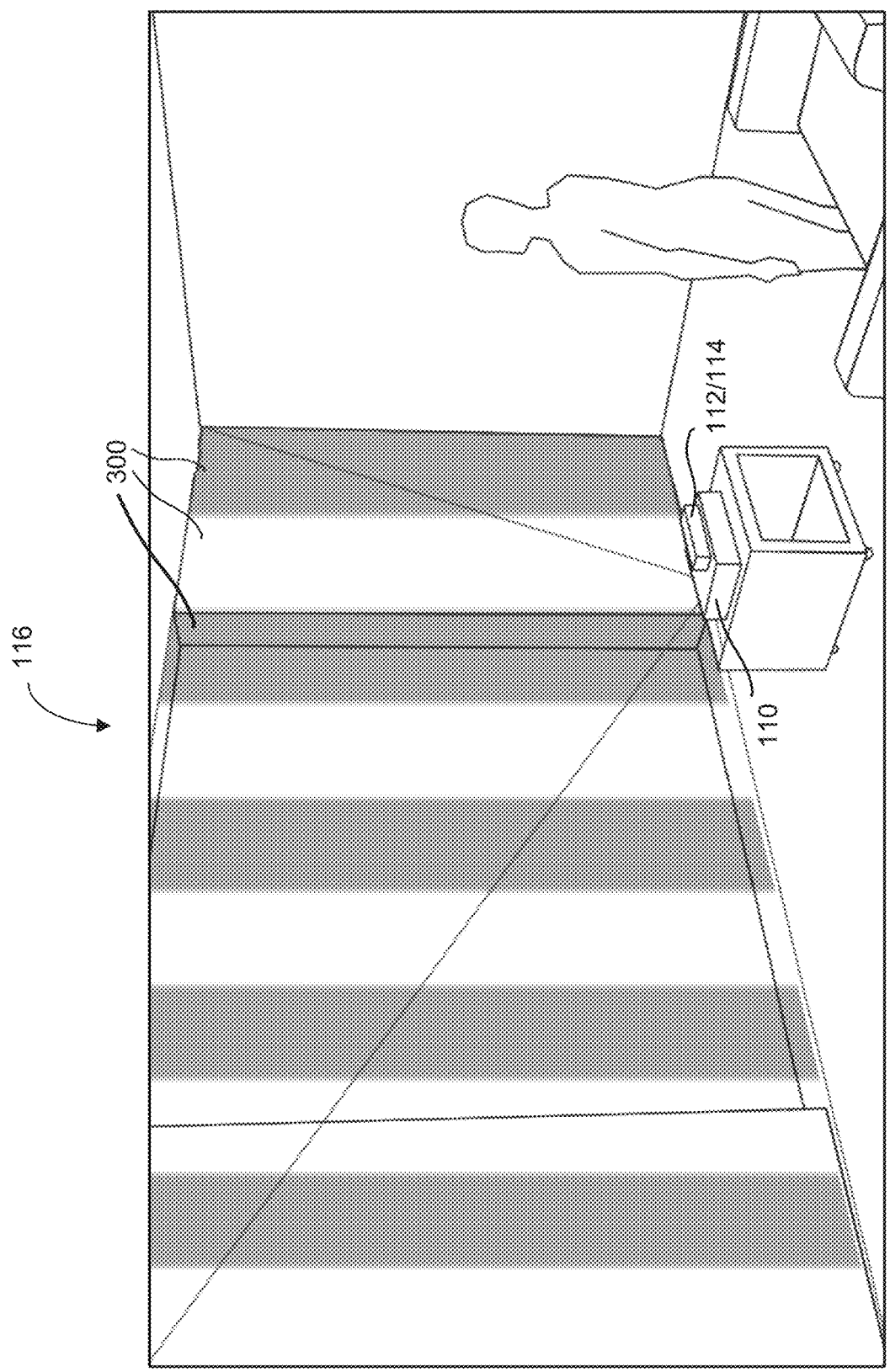
FIG. 3 illustrates an example projection of structured light patterns on a projection area, according to some implementations.

FIG. 3 illustrates an example projection of structured light patterns 300 on projection area 116, according to some implementations. In various implementations, depth sensor 112/114 measures the degree of displacement and varying widths of visual light patterns. Depth sensor 112/114 also measures real-world dimensional measurements of the scene collected using infrared light. This results in scale 3D coordinates of the area geometry and projected display.

In some implementations, projection area 116 may be a flat surface such as a wall. In various implementations, projection area 116 may include one or more walls in varying degrees of vision (e.g., 130°, 180°, etc.).

During the projection mapping, in some implementations, depth camera 112/114 of system 104 scans projection area 116 in order to collect depth data, or environment geometry data, associated with the projection area for projection mapping. For ease of illustration, depth camera 112 and depth camera 114 are shown as a single device, and referred to as depth camera 112/114.

Figure 4:
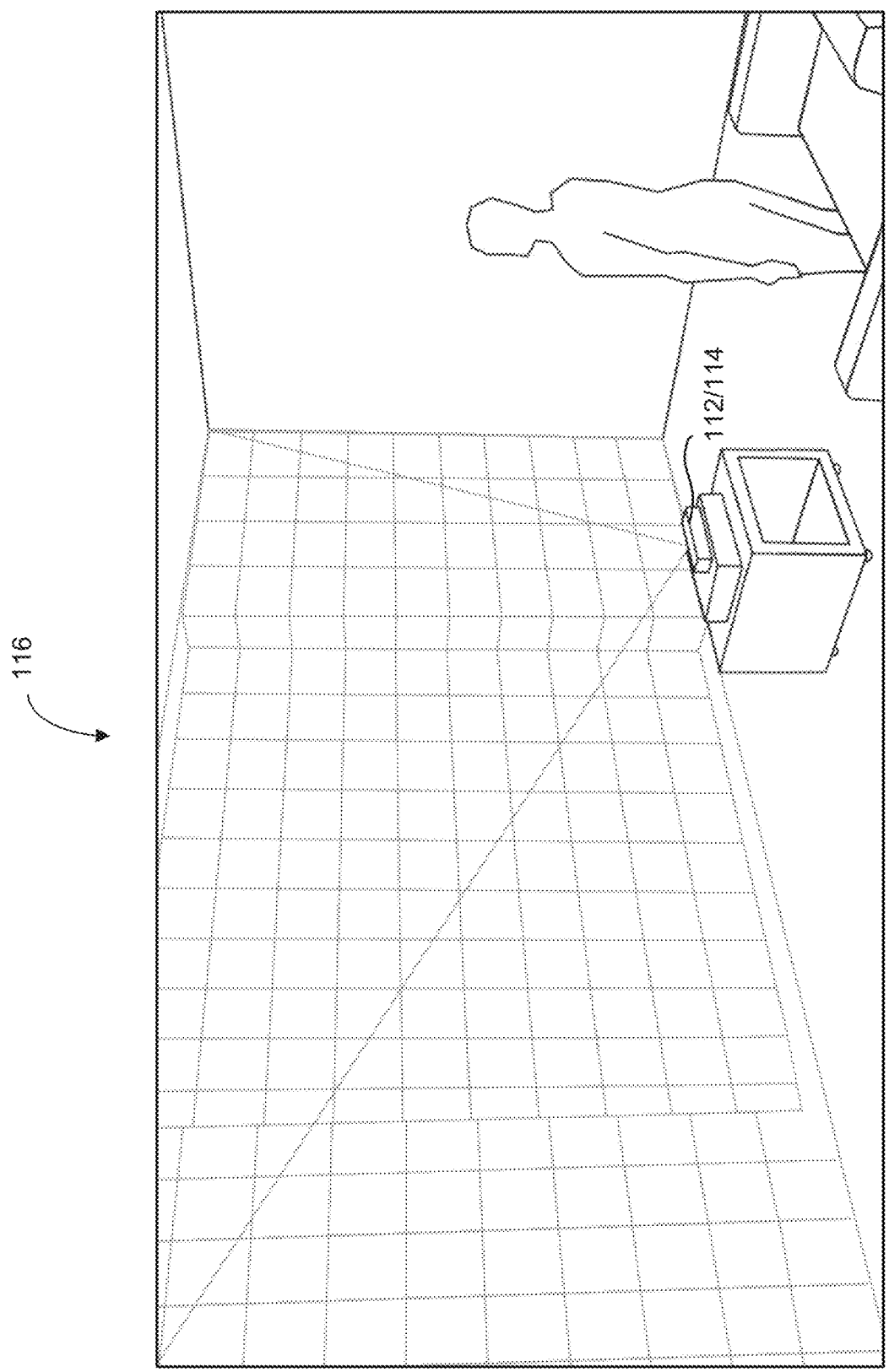
FIG. 4 illustrates an example scanning of the projection area, according to some implementations.

FIG. 4 illustrates an example scanning of projection area 116, according to some implementations. Depth data or environment geometry data may include, for example, topography, size measurements, height measurements, width measurements, depth measurements, etc.

Depth camera 112/114 senses projection fields and enables parallax distortion of the projected virtual environment by 3D projector 110.

Referring still to FIG. 2, at block 204, system 104 collects user information associated with the user (e.g., local user). As described in more detail herein, the user information may include red-green-blue (RGB) video data, depth data, skeletal tracking information, topography information, and movement information.

Figure 5:
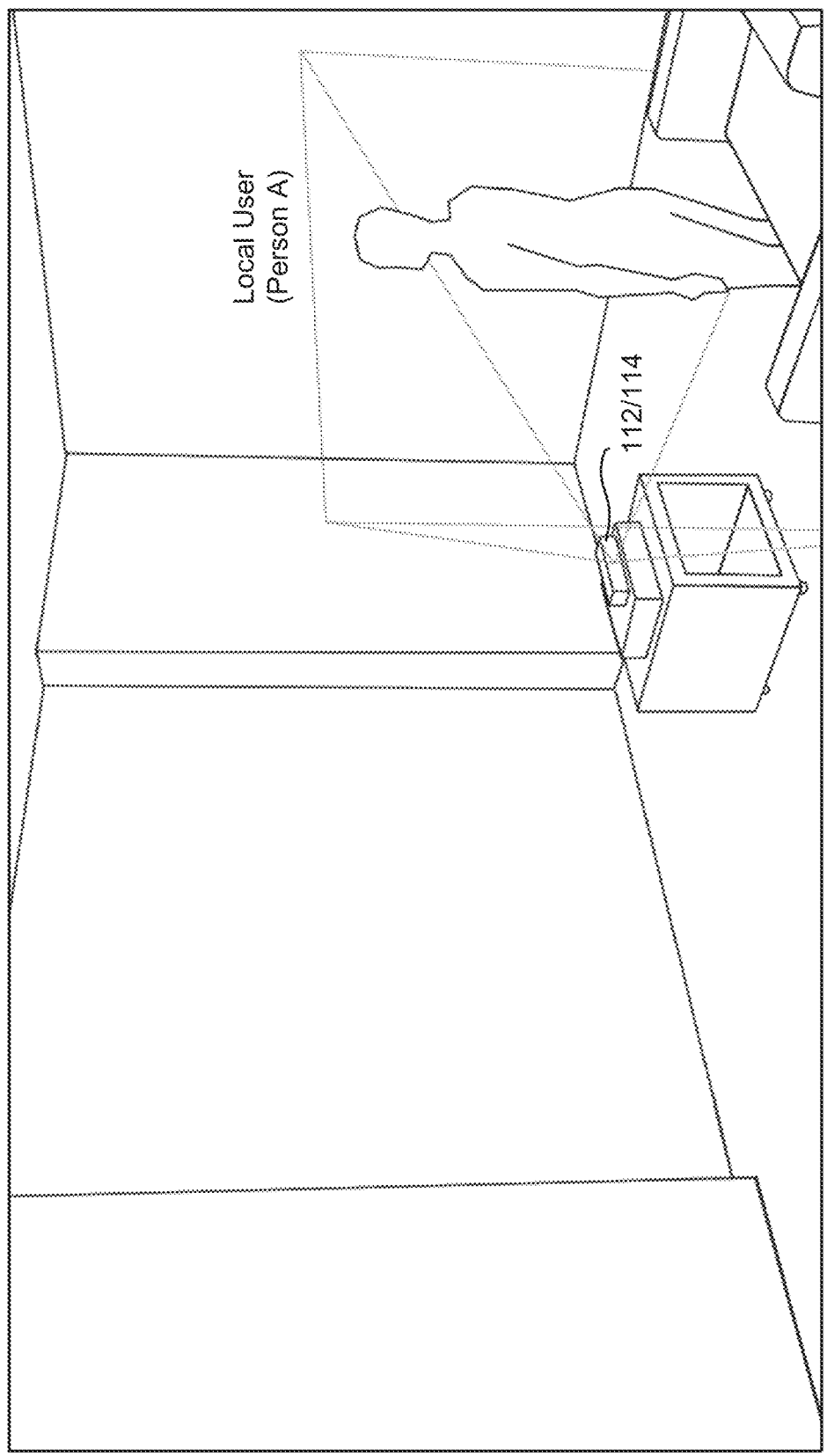
FIG. 5 illustrates an example scanning of the local user, according to some implementations.

FIG. 5 illustrates an example scanning of the local user (e.g., Person A), according to some implementations. In various implementations, depth sensor 112/114 of system 104 scans the local user to collect RGB video data, depth data, and skeletal tracking information of the user, and topography information. In some implementations, the topography information may include the floor plane on which the user is standing.

In some implementations, system 104 masks off the users depth data to outline a user identified in the scene and to render a 3D mesh inside the virtual scene. In some implementations, system 104 textures the virtual scene with the RGB video data provided by depth camera 112/114 in order to perform 3D mesh reconstruction.

In various implementations, depth camera 112/114 also detects user movement information of the user such as head movement, body movement, hand movement of the users, etc. Depth camera 112/114 also detects the users interaction with the projected virtual environment and/or the projected virtual objects in the virtual environment in order to enable 3D virtualization of the virtual environment by the 3D projector.

System 104 uses the environment geometry data and user information to create a 3D virtualization of a scene in the virtual environment and one or more users, and combines them into the shared virtual environment.

Referring still to FIG. 2, at block 206, system 104 positions the local user in the virtual environment based on the projection mapping and the user information. For example, in various implementations, 3D projector 110 positions the local user such that the local user is aligned to the floor plane in the scene of the virtual environment.

Figure 6:
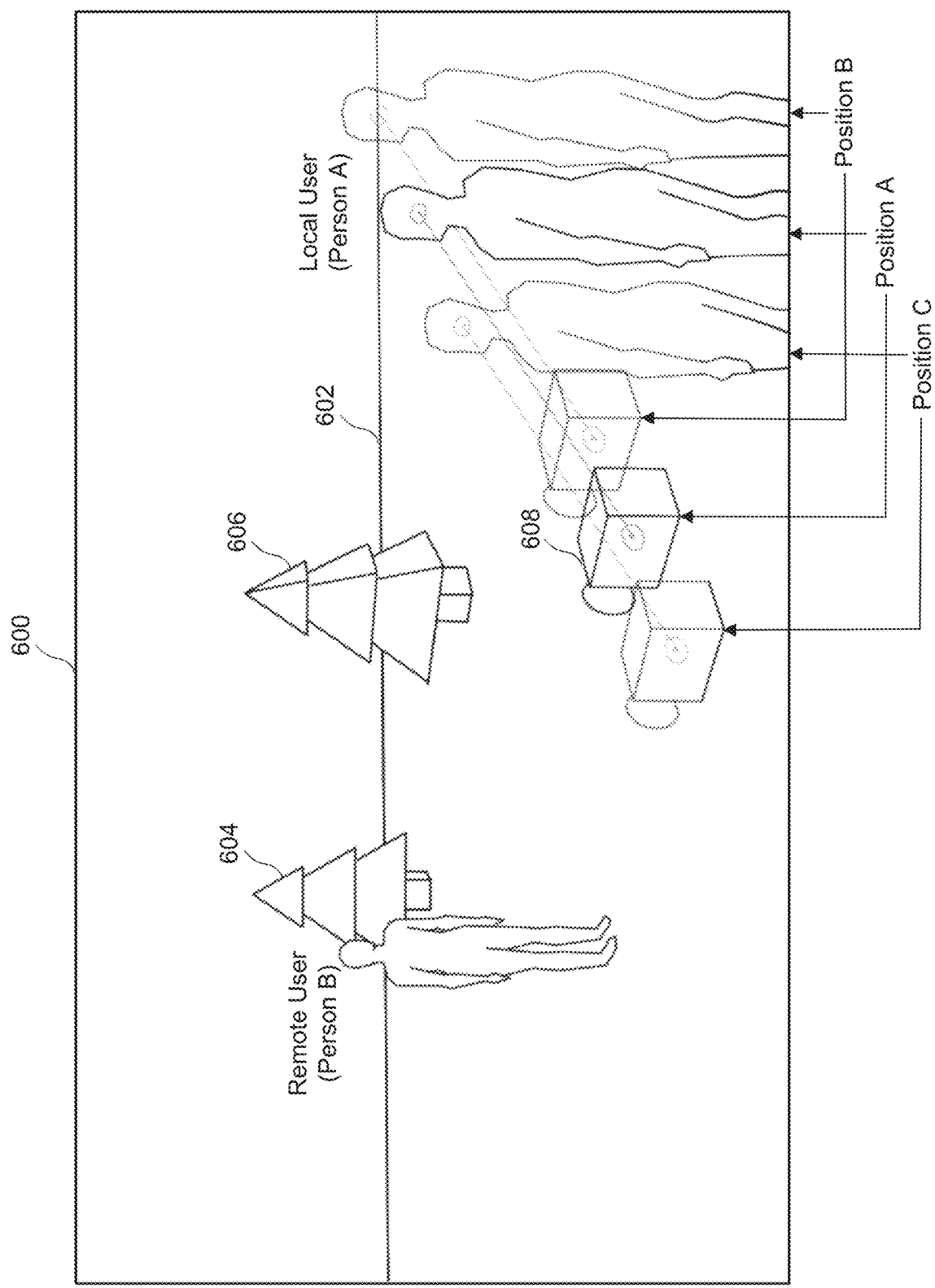
FIG. 6 illustrates an example positioning of the local user in the virtual environment, according to some implementations.

FIG. 6 illustrates an example positioning of the local user in the virtual environment 600, according to some implementations. As indicated herein, 3D projector 110 positions the local user (e.g., Person A) such that the local user is aligned to the floor plane 602 in the scene of virtual environment 600. Also, if there are multiple users (e.g., Person A, Person B, etc.), 3D projector 110 positions all of the users (local and remote users) such that all users are aligned to floor plane 602 in the scene of virtual environment 600. Also shown are trees 604 and 606. Other types of objects in virtual environment 600 are possible. For example, virtual environment 600 may include other remote users, buildings, roads, cars, etc. In some implementations, system 104 may use a game engine to render the mesh of the local user in virtual environment 600.

In various implementations, because system 104 obtains full skeletal tracking of the local user, system 104 may also determine the head position of the local user. Tracking the local user's head position enables co-location of virtual cameras in the virtual scene with the local user's POV.

In various implementations, system 104 associates a virtual camera 608 with the local user based on the projection mapping and the user information, where the POV of virtual camera 608 is based on the local user head position and direction. As such, in various implementations, the POV of virtual camera 608 is calibrated such that the POV of virtual camera 608 is substantially the same as the POV of the user and tracks the POV of the user based on the head position and direction of the local user. As such, the POV of virtual camera 608 may be treated as, and referred to as, the POV of the local user.

In various implementations, system 104 performs head tracking in order to move virtual camera 608 associated with the local user for parallax effect, which may also be referred to as head parallax. In various implementations, head parallax is an effect whereby the position or direction of an object appears to differ when viewed from different positions (e.g., an object that the user is looking at such as a tree, another user, etc.).

In various implementations, if the actual head of the local user moves from left to right, the POV of virtual camera 608 associated with the local user also moves from left to right in the virtual environment. For example, in a scenario where local user (e.g., Person A) is looking at remote user (e.g., Person B), if the local user is facing directly toward remote user (Position A), the location of virtual camera 608 and the corresponding POV is also at Position A. As a result, the local user will view all of the remote user straight on.

In a scenario where the local user (e.g., Person A) physically steps to the local user's right (Position B), the location of virtual camera 608 and the corresponding POV also shifts to the local user's right (Position B). As a result, the local user will perceive that remote user (e.g., Person B) shifts to local user's left.

In a scenario where the local user (e.g., Person A) physically steps to local user's left (Position C), the location of virtual camera 608 and the corresponding POV also shifts to the local user's left (Position C). As a result, the local user will perceive that remote user shifts to the local user's right.

In another scenarios, if the local user and remote user are facing each other and there is a tree (e.g., tree 606) between local user and remote user, the local user would see the remote user and one side of the tree, and remote user would see the local user and the other side of the tree.

Referring still to FIG. 2, at block 208, system 104 determines the POV of the local user in the virtual environment. In some implementations, the POV of the local user may be determined by a distance algorithm that approximates a virtual distance between the local user and one or more objects in virtual environment 600. In various implementations, the virtual distances may be based on one or more of the projection mapping, the user information, and one or more objects in the virtual environment 600. As indicated herein, in various implementations, the POV of virtual camera 608 associated with the user is substantially the same as the POV of the user and tracks the POV of the user.

Figure 7:
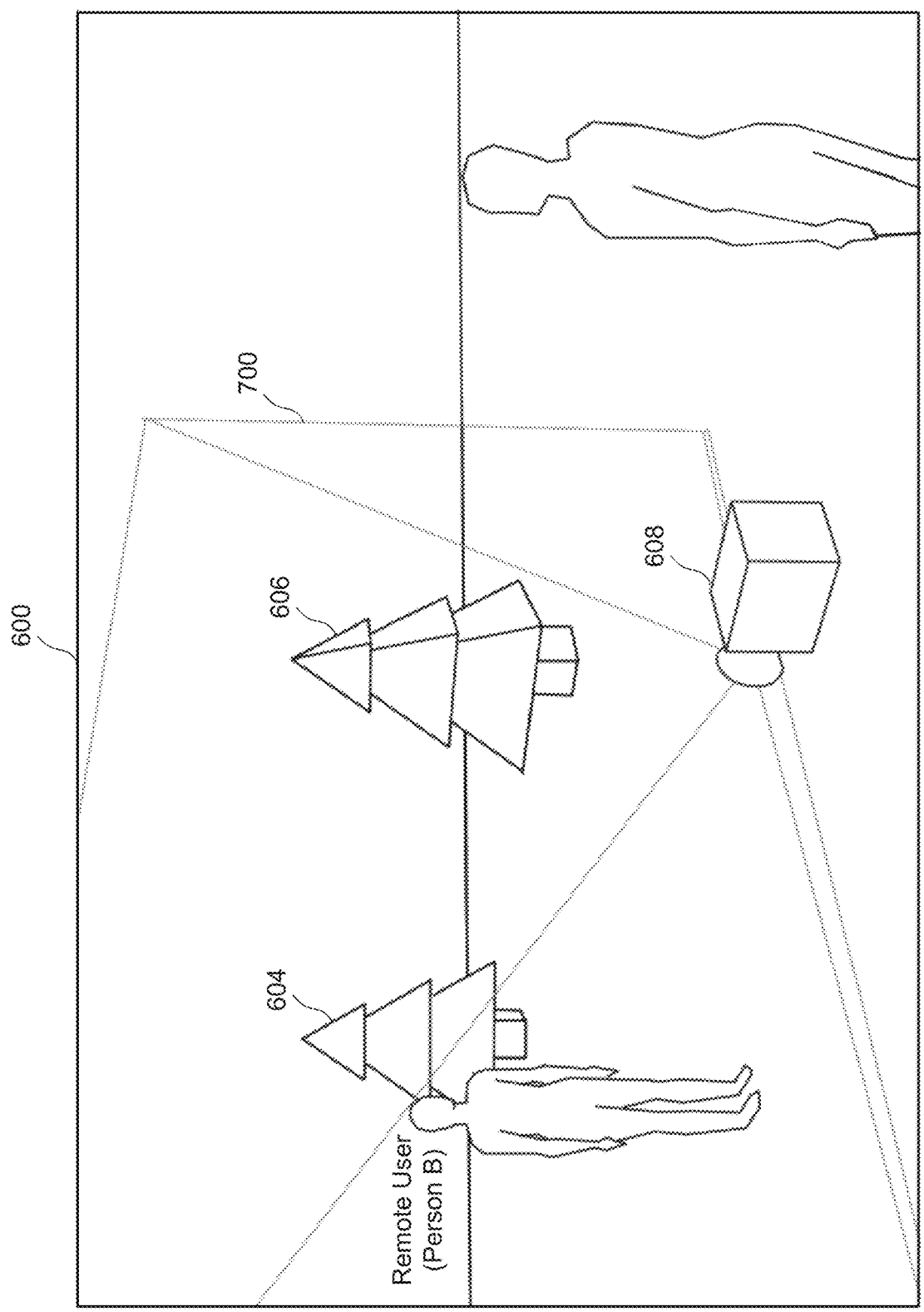
FIG. 7 illustrates an example projecting of the virtual environment onto the projection area based on the point of view (POV) of the local user, according to some implementations.

FIG. 7 illustrates an example projecting of virtual environment 600 onto the projection area based on the POV 700 of the local user, according to some implementations. As shown, in this particular scenario, POV 700 includes the remote user (e.g., Person B) and trees 604 and 606.

At block 210, system 104 projects virtual environment 600 onto the projection area 116 based on the POV of the local user. In various implementations, virtual environment 600 and associated objects are in life-size in scale. In various implementations, 3D projector 110 projects a 2-dimensional (2D) scene onto a 3D virtual environment around one or more users in order to render the one or more virtual objects including users in the virtual environment.

Figure 8:
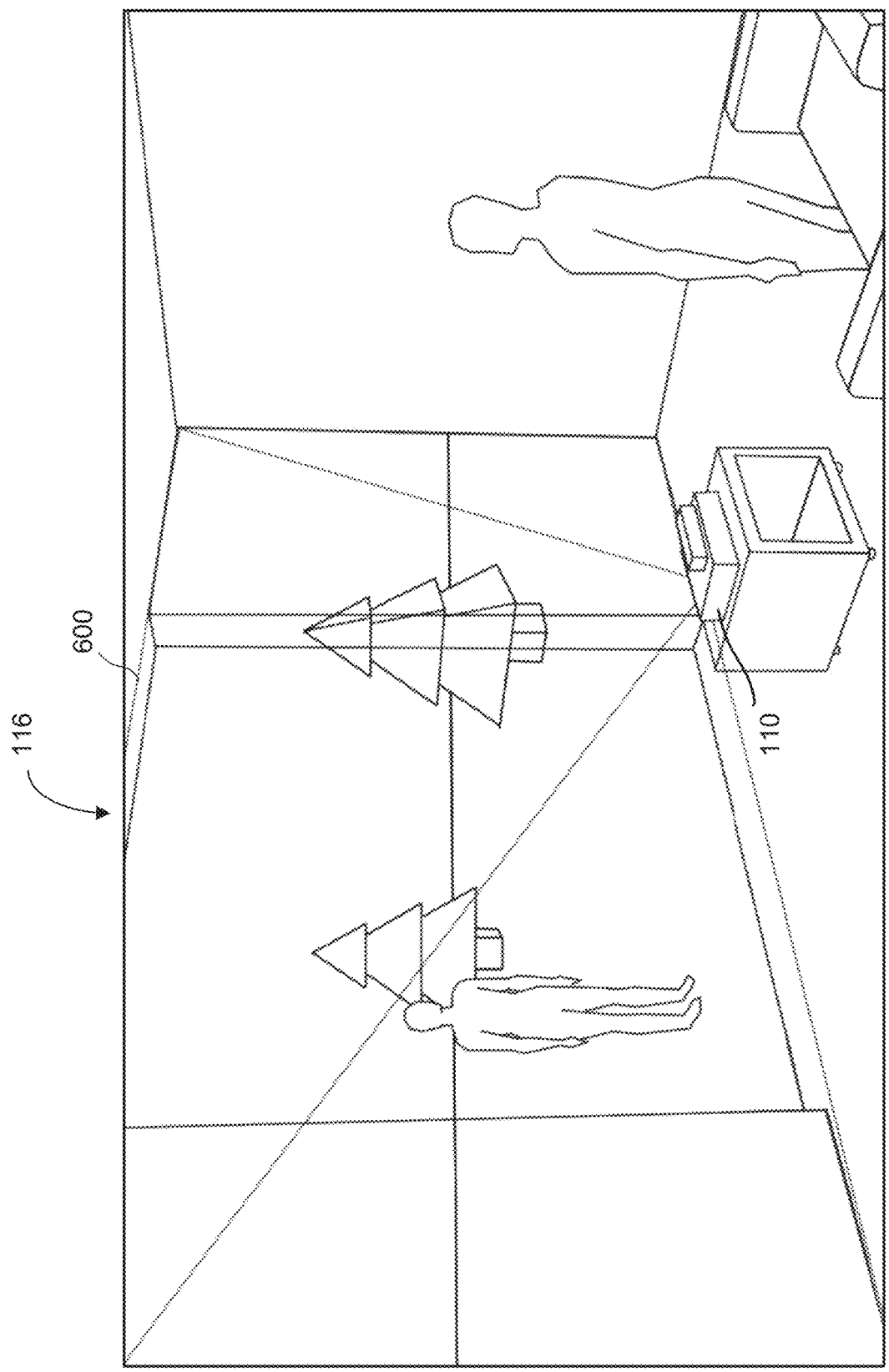
FIG. 8 illustrates an example projecting of the POV of the local user in life-size scale in the virtual environment, according to some implementations.

FIG. 8 illustrates an example projecting of virtual environment 600 onto the projection area 116 based on the POV of the local user, according to some implementations. In various implementations, the POV of the local user is based on a one-to-one ratio of the actual size of the user to the virtual size of the user in the virtual environment.

System 104 determines the actual height of the local user based on the depth data of the user. System 102 determines the size of the scene and objects in the virtual environment, adjusts/calibrates the objects including local and remote users in the virtual environment, and 3D projector 110 projects the virtual environment onto the projection area on a one-to-one scale (e.g., life size).

System 104 maps the positions of the users in physical space to the rendered users in the virtual environment. Because the 3D rendering is at a one-to-one scale, the local user has the visual sense that the remote user is co-located in the same virtual environment, and vice versa.

In some implementations, 3D projector 110 includes a wide-angle lens system for stereoscopic rendering of virtual environment 600. 3D projector 110 provides side-by-side stereoscopic rendering for a 3D display of virtual environment 600 without the need for a multiple projector setups. The wide-angle lens system of 3D projector 110 increases the throw projection without a need for a multi-projector setup.

In various implementations, system 104 simulates eye contact in the virtual environment when the local user (e.g., Person A) faces the remote user (e.g., Person B). More specifically, system 104 simulates the impression to the local user that the local user is making eye contact with the remote user in the virtual environment. This is because 3D projector 110 renders a 3D image of the virtual environment. As indicated herein, system 104 tracks the head movement of all of the users in order to achieve head parallax.

In various implementations, if both the local user and remote user are facing each other based on head parallax, system 104 positions the POV of the local user such that the POV of the virtual camera of the local user is facing the remote user. Conversely, system 104 positions the POV of the remote user such that the POV of the virtual camera of the remote user is facing the local user. In other words, system 104 renders the POV of the virtual cameras such that they are co-located to the head positions of the respective users. As a result, the general direction of the face of the rendered remote user faces the POV of the virtual camera of the local user based on the actual head position of the remote user. Similarly, the general direction of the face of the rendered local user faces the POV of the virtual camera of the remote user based on the actual head position of the local user. This gives both users the impression that they are making eye contact.

In an example scenario, if the local user (e.g., Person A) selects a given object such as a ball in the virtual environment, and the local user throws the object toward the remote user (e.g., Person B) in the virtual environment, the object will appear to the local user in environment 100 to travel away from the local user toward remote user. Conversely, the object will appear to the remote user in environment 102 to travel away from the local user toward remote user. If the remote user selects to catch the object, the object will appear to the remote user in environment 102 to have been caught. Conversely, the object will appear to the local user in environment 100 to have been caught by the remote user. In some implementations, if the remote user throws the objet back, the scene may rotate in order to show both users throwing the object back and forth, with head position affecting parallax.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations described herein may be used in various virtual reality and augmented reality applications such as teleconferencing, collaboration, training, instruction, leisure and gaming, sports, interactive dance, yoga, remote medicine, therapy such as physical therapy, industrial applications, etc.

Figure 9:
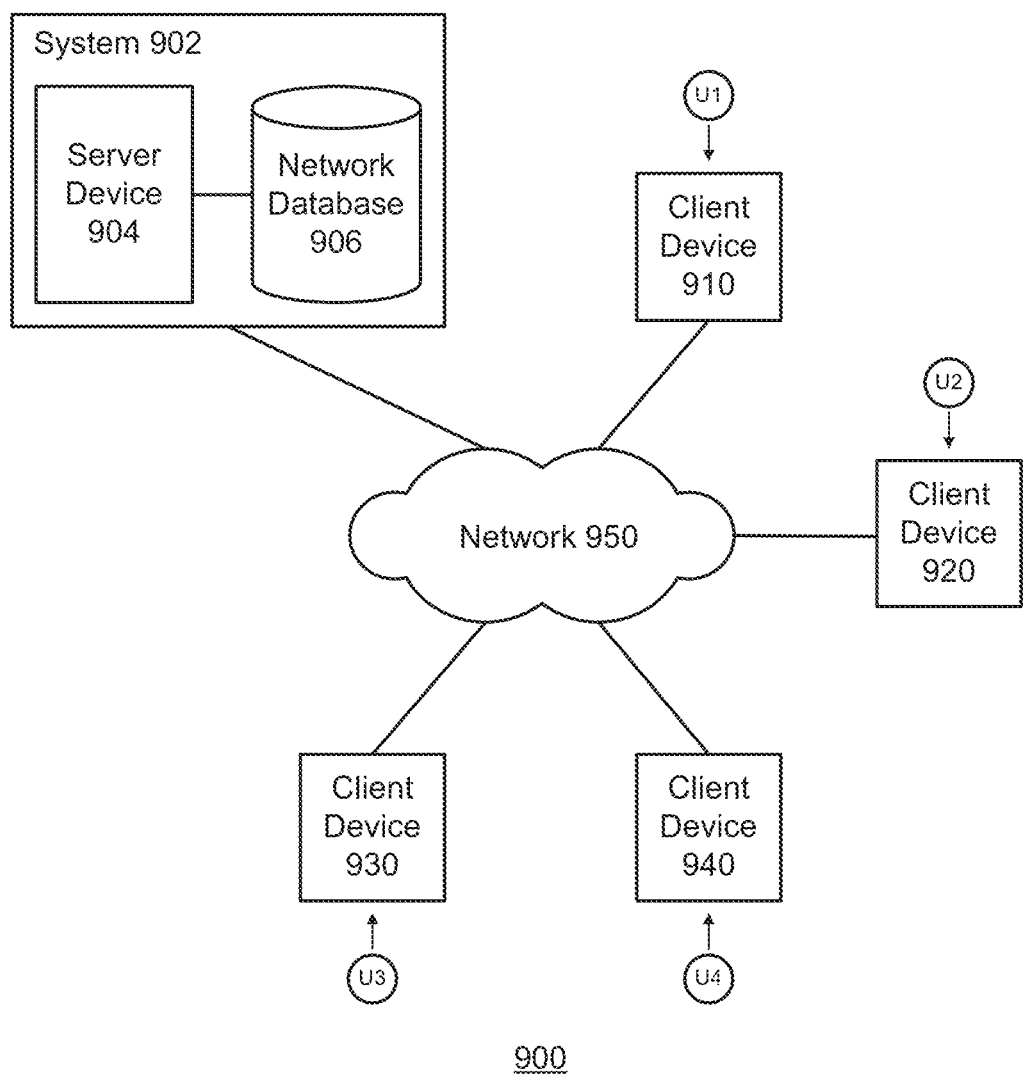
FIG. 9 illustrates a block diagram of an example network environment, which may be used for some implementations described herein.

FIG. 9 illustrates a block diagram of an example network environment 900, which may be used for some implementations described herein. In some implementations, network environment 900 includes a system 902, which includes a server device 904 and a network database 906. Network environment 900 also includes client devices 910, 920, 930, and 940, which may communicate with each other directly or via system 902. Network environment 900 also includes a network 950.

For ease of illustration, FIG. 9 shows one block for each of system 902, server device 904, and network database 906, and shows four blocks for client devices 910, 920, 930, and 940. Blocks 902, 904, and 906 may represent multiple systems, server devices, and network databases. Also, there may be any number of client devices. In other implementations, network environment 900 may not have all of the components shown and/or may have other elements including other types of elements instead of, or in addition to, those shown herein. In various implementations, users U1, U2, U3, and U4 may interact with each other or with system 902 using respective client devices 910, 920, 930, and 940. In various implementations, each of client devices 910, 920, 930, and 940 may represent one of telepresence systems 104 and 124 of FIG. 1.

In the various implementations described herein, a processor of system 902 and/or a processor of any client device 910, 920, 930, and 940 causes the elements described herein (e.g., information, etc.) to be displayed in a user interface on one or more display screens.

Implementations may apply to any network system and/or may apply locally for an individual user. For example, implementations described herein may be implemented by system 902 and/or any client device 910, 920, 930, and 940. System 902 may perform the implementations described herein on a stand-alone computer, tablet computer, smartphone, etc. System 902 and/or any of client devices 910, 920, 930, and 940 may perform implementations described herein individually or in combination with other devices.

Figure 10:
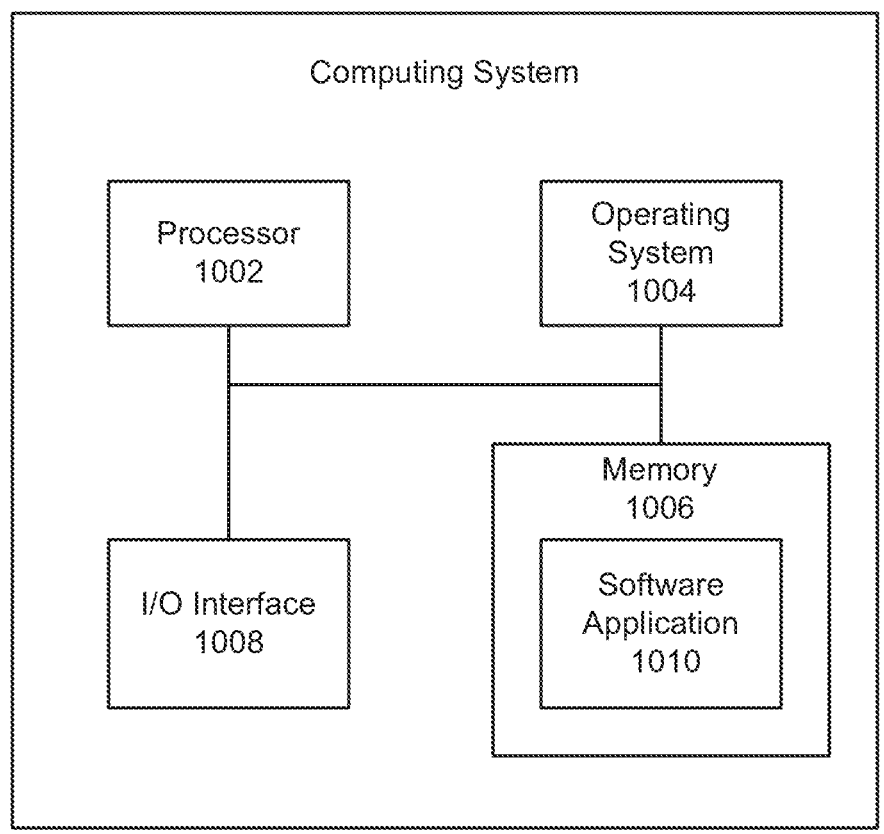
FIG. 10 illustrates a block diagram of an example computing system, which may be used for some implementations described herein.

FIG. 10 illustrates a block diagram of an example computing system 1000, which may be used for some implementations described herein. For example, computing system 1000 may be used to implement computing systems 106, 108, 126, and/or 128 of FIG. 1 and/or server device 904 of FIG. 9, as well as to perform the implementations described herein. In some implementations, computing system 1000 may include a processor 1002, an operating system 1004, a memory 1006, and an input/output (I/O) interface 1008. In various implementations, processor 1002 may be used to implement various functions and features described herein, as well as to perform the method implementations described herein. While processor 1002 is described as performing implementations described herein, any suitable component or combination of components of computing system 1000 or any suitable processor or processors associated with computing system 1000 or any suitable system may perform the steps described. Implementations described herein may be carried out on a user device, on a server, or a combination of both.

Computing system 1000 also includes a software application 1010, which may be stored on memory 1006 or on any other suitable storage location or computer-readable medium. Software application 1010 provides instructions that enable processor 1002 to perform the implementations described herein and other functions. Software application may also include an engine such as a network engine for performing various functions associated with one or more networks and network communications. The components of computing system 1000 may be implemented by one or more processors or any combination of hardware devices, as well as any combination of hardware, software, firmware, etc.

For ease of illustration, FIG. 10 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, computing system 1000 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
    scanning a projection area;
    collecting environment geometry data based on the scanning of the projection area;
    performing projection mapping of the projection area based on the environment geometry data;
    scanning a user to collect topography information;
    collecting user information associated with the user and one or more remote users, wherein the user information comprises the topography information, and wherein the topography information comprises a first floor plane on which the user is standing, a second floor plane in a scene of a virtual environment, and a third floor plane on which each of the one or more remote users is standing;
    positioning the user and the one or more remote users in the virtual environment based on the projection mapping and the user information such that the first floor plane, the second floor plane, and the third floor plane are aligned;
    tracking head positions of the user and the one or more remote users;
    determining head parallax of the user and the one or more remote users based on the tracking of the head positions;
    determining a point of view of the user and the one or more remote users in the virtual environment based on the head parallax of the user and the one or more remote users;
    computing a virtual distance between the user and one or more objects in the virtual environment, wherein the one or more objects comprises the one or more remote users, and wherein the virtual distance is based on one or more of the projection mapping, the user information, and the one or more objects in the virtual environment; and
    projecting the virtual environment onto the projection area based on the point of view of the user, wherein the point of view of the user is substantially equal to a virtual camera associated with the user, and wherein the point of view of the virtual camera tracks the point of view of the user.

2. The method of claim 1, wherein, to position the user in the virtual environment, the method further comprises positioning the user such that the user is aligned to a floor plane in the scene of the virtual environment.

3. The method of claim 1, wherein the performing of the projection mapping comprises:
    displaying structured light patterns on the projection area; and
    collecting depth data associated with the projection area.

4. The method of claim 1, wherein the user information comprises one or more of red-green-blue video data, depth data, and skeletal tracking information.

5. The method of claim 1, further comprising rendering a 3-dimensional (3D) object inside the virtual environment based on depth data associated with the projection area.

6. The method of claim 1, further comprising simulating eye contact between the user and at least one remote user of the one or more remote users in the virtual environment when the user faces the at least one remote user.

7. Software encoded in one or more non-transitory computer-readable storage media for execution by one or more processors and when executed operable to perform operations comprising:
    scanning a projection area;
    collecting environment geometry data based on the scanning of the projection area;
    performing projection mapping of the projection area based on the environment geometry data;
    scanning a user to collect topography information;
    collecting user information associated with the user and one or more remote users, wherein the user information comprises the topography information, and wherein the topography information comprises a first floor plane on which the user is standing, a second floor plane in a scene of a virtual environment, and a third floor plane on which each of the one or more remote users is standing;
    positioning the user and the one or more remote users in the virtual environment based on the projection mapping and the user information such that the first floor plane, the second floor plane, and the third floor plane are aligned;
    tracking head positions of the user and the one or more remote users;
    determining head parallax of the user and the one or more remote users based on the tracking of the head positions;
    determining a point of view of the user and the one or more remote users in the virtual environment based on the head parallax of the user and the one or more remote users;
    computing a virtual distance between the user and one or more objects in the virtual environment, wherein the one or more objects comprises the one or more remote users, and wherein the virtual distance is based on one or more of the projection mapping, the user information, and the one or more objects in the virtual environment; and
    projecting the virtual environment onto the projection area based on the point of view of the user, wherein the point of view of the user is substantially equal to a virtual camera associated with the user, and wherein the point of view of the virtual camera tracks the point of view of the user.

8. The software of claim 7, wherein the projection mapping is based on depth data associated with the projection area.

9. The software of claim 7, wherein, to perform the projection mapping, the software when executed is further operable to perform operations comprising:

displaying structured light patterns on the projection area; and collecting depth data associated with the projection area.

10. The software of claim 7, wherein the user information comprises one or more of red-green-blue video data, depth data, and skeletal tracking information.

11. The software of claim 7, wherein the user information comprises topography information.

12. The software of claim 7, wherein the software when executed is further operable to perform operations comprising performing head tracking in order to move a virtual camera associated with the user for parallax effect.

13. The software of claim 7, wherein the software when executed is further operable to perform operations comprising simulating eye contact in the virtual environment.

14. A system comprising:
one or more processors; and
logic encoded in one or more non-transitory computer-readable storage media for execution by the one or more processors and when executed operable to perform operations comprising:
scanning a projection area;
collecting environment geometry data based on the scanning of the projection area;
performing projection mapping of the projection area based on the environment geometry data;
scanning a user to collect topography information;
collecting user information associated with the user and one or more remote users, wherein the user information comprises the topography information, and wherein the topography information comprises a first floor plane on which the user is standing, a second floor plane in a scene of a virtual environment, and a third floor plane on which each of the one or more remote users is standing;
positioning the user and the one or more remote users in the virtual environment based on the projection mapping and the user information such that the first floor plane, the second floor plane, and the third floor plane are aligned;
tracking head positions of the user and the one or more remote users;
determining head parallax of the user and the one or more remote users based on the tracking of the head positions;
determining a point of view of the user and the one or more remote users in the virtual environment based on the head parallax of the user and the one or more remote users;
computing a virtual distance between the user and one or more objects in the virtual environment, wherein the one or more objects comprises the one or more remote users, and wherein the virtual distance is based on one or more of the projection mapping, the user information, and the one or more objects in the virtual environment; and
projecting the virtual environment onto the projection area based on the point of view of the user, wherein the point of view of the user is substantially equal to a virtual camera associated with the user, and wherein the point of view of the virtual camera tracks the point of view of the user.

15. The system of claim 14, wherein the projection mapping is based on depth data associated with the projection area.

16. The system of claim 14, wherein, to perform the projection mapping, the logic when executed is further operable to perform operations comprising:
displaying structured light patterns on the projection area; and collecting depth data associated with the projection area.

17. The system of claim 14, wherein the user information comprises one or more of red-green-blue video data, depth data, and skeletal tracking information.

18. The system of claim 14, wherein the user information comprises topography information.

19. The system of claim 14, wherein the logic when executed is further operable to perform operations comprising performing head tracking in order to move a virtual camera associated with the user for parallax effect.

* * * * *